Dec. 4, 1928.

E. Y. ROBINSON 1,693,668

RECTIFICATION OF ALTERNATING CURRENT

Filed June 23, 1925

Witnesses:
S. M. Pineles
J. H. Vreeken

Inventor
Ernest Yeoman Robinson
By
Chesley G. Carr
Attorney.

Patented Dec. 4, 1928.

1,693,668

UNITED STATES PATENT OFFICE.

ERNEST YEOMAN ROBINSON, OF LYMM, ENGLAND, ASSIGNOR, BY MESNE ASSIGNMENTS, TO WESTINGHOUSE ELECTRIC & MANUFACTURING COMPANY, A CORPORATION OF PENNSYLVANIA.

RECTIFICATION OF ALTERNATING CURRENT.

Application filed June 23, 1925, Serial No. 38,959, and in Great Britain June 24, 1924.

This invention relates to the rectification of alternating current by means of vacuum electric devices.

In the rectification of alternating current by diode thermionic valve rectifiers in which the valve rectifiers are connected to the secondary of the transformer associated with the alternating current, current only flows through a rectifier during the part of the alternating current cycle when the voltage of the phase winding connected to the anode of the rectifier is positive and greater than the line voltage on the anode; for example in a three-phase half-wave valve rectifier system current only flows for approximately one-third of a cycle, in a four-phase half-wave system only for one-quarter of a cycle, and in a three-phase full wave (six phase half wave) rectifier system current only flows for one sixth of a cycle. Also owing to the saturation effect there is a fixed upper limit to the current which a thermionic valve rectifier can pass for steady cathode emission however large the voltage across the valve may be. In addition, the space charge energy loss increases with the inverse voltage across the valve due to the necessity for larger separations between the electrodes, and the cathode energy loss increases with the current through the valve. Consequently the output in any given valve rectifier system as previously arranged is limited, and the overall efficiency is low. The object of the present invention is to increase the efficiency of such a system.

According to the invention, in a rectifying system employing vacuum electric devices, a commutator is provided to disconnect one or more of the devices, for the whole or a portion of their non-conducting periods, from the alternating current source and to reconnect them for their conducting periods, the disconnection and reconnection taking place during the time when the device is non-conducting. By this means the ratio of inverse voltage to operating voltage across the vacuum electric device is decreased. In a polyphase rectification system, in the preferred method a commutator is arranged in addition to the above to connect a vacuum electric device to one or more other phases during its non-conducting period for one phase. In addition, by this means, increased rectified current is supplied by the vacuum electric device per cycle of the alternating current.

Figure 1:
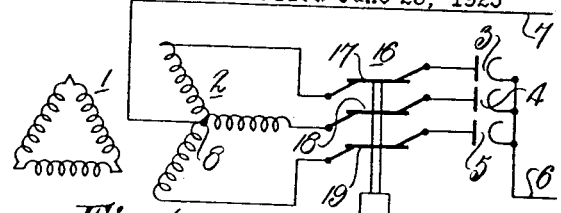
Figure 2:
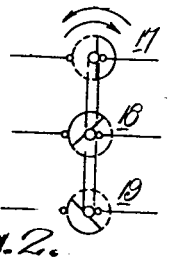
Figure 3:
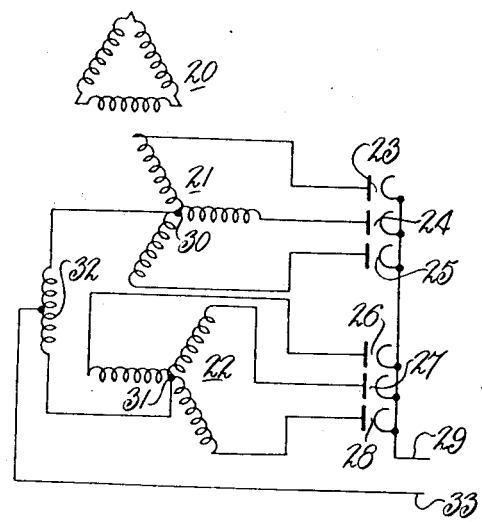
Figure 4:
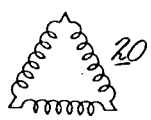
Figure 5:
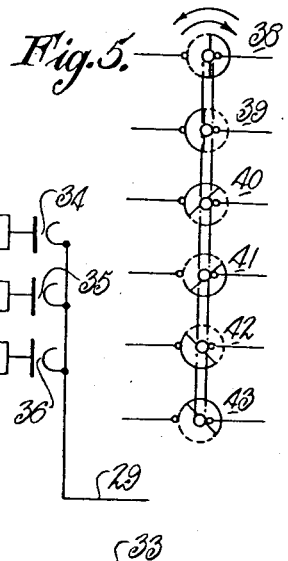

In order that the invention can be fully understood it will be described with reference to the accompanying drawings. Fig. 1 is an electrical diagram illustrating a three-phase half-wave valve rectifier system in which a commutator is employed according to the invention and Fig. 2 illustrates diagrammatically one construction of said commutator. Fig. 3 is an electrical diagram illustrating a three-phase full wave (six phase half wave) valve rectifier system as commonly employed. Fig. 4 is an electrical diagram illustrating a three-phase full wave rectifier system in which a commutator is employed according to the invention, and Fig. 5 illustrates diagrammatically one construction of said commutator.

The usual three-phase hot-cathode valve rectifier of the prior art comprised anodes connected to each supply line and cathodes connected in common to one terminal of the load. The other terminal of the load was then connected to the neutral point of the three-phase supply. Analysis shows that current only flows through such a rectifier during one-third of a cycle of the alternating current. Also, owing to the saturation effect there is a fixed upper limit to the current which a valve rectifier can pass for steady cathode emission, however large the voltage across the valve may be. In addition, the space charge energy loss increases with the inverse voltage across the valve, due to the necessity for larger separations between the electrodes, and the cathode energy loss increases with the current through the valve. Consequently the output in valve rectifier systems as previously arranged is limited and the overall efficiency is low.

Referring to Fig. 1 a commutator 16 is employed according to the invention in a valve rectifier system of the foregoing type. Said commutator comprises switching members 17, 18 and 19. The member 17 is connected in the lead from the outer end of one phase winding of the secondary 2 of the supply transformer to the anode of the valve rectifier 3. Similarly the switching members 18 and 19 are connected respectively in the leads from the outer ends of the other two phase windings of the secondary 2 to the anodes of the corresponding valve rectifiers 4 and 5. Said switching members are adapted to disconnect the anodes of the valve rectifiers from the corresponding phase windings of the secondary 2 during the portions of the alternating current cycle, when the valve rectifier is non-conducting. One construction of the switching members 17, 18 and 19 is illustrated in Fig. 2. Each member comprises a disc having semi-circular conducting and non-conducting portions. The three conducting portions are electrically connected to slip rings and are mounted on a rotatable shaft, the semicircular conducting portions being phase displaced with respect to each other by 120°. Electrical connection to the discs is made by suitably arranged brushes. The rotatable shaft is preferably driven by a synchronous motor energized by the alternating current. With the arrangement shown in Fig. 2, the commutator is adapted to be rotated in a clockwise direction when the phase rotation of the alternating current is anti-clockwise. The discs are arranged so that disconnection of the anode of a rectifier occurs 30 electrical degrees after the rectifier has become non-conducting and reconnection occurs 30 electrical degrees before the rectifier again becomes conductive. The average inverse voltage across the rectifiers is thereby greatly decreased.

Referring to Fig. 3 a double-Y valve rectifying system is illustrated, that is, a rectifying system comprising two three-phase half wave rectifiers phase differentiated 180° with respect to each other and provided with means for ensuring that the rectifier units operate independently of each other so that the valves pass current for one-third of a cycle. The three phase alternating current is associated with a transformer having a delta-connected primary 20 and two star-connected secondaries 21 and 22, corresponding phase windings of the two secondaries being phase differentiated with regard to each other by 180° but wound on the same transformer leg. The phase windings of the secondary 21 are connected respectively to the anodes of corresponding valve rectifiers 23, 24 and 25, and the phase windings of the secondary 22 are connected respectively to the anodes of corresponding valve rectifiers 26, 27 and 28. The cathodes of said valve rectifiers are connected to one output lead 29. The star points 30 and 31 respectively of the secondaries 21 and 22 are connected through a choke coil 32 from the mid-point of which the other output lead 33 is led. The provision of the choke coil 32 ensures that each of the two three-phase half wave systems formed by the secondaries 21 and 22 with their corresponding valve rectifiers respectively operates independently. In this arrangement it is evident that each valve rectifier is conducting for only one-third of the cycle of the alternating current.

Referring to Fig. 4 the arrangement of a commutator according to the invention is illustrated applied to a double-Y rectifier system. Only three rectifiers 34, 35 and 36 are provided, and a commutator 37 is arranged to connect the respective anodes of said rectifiers to corresponding phase windings of both the secondaries 21 and 22 in a predetermined manner. The commutator 37 comprises six switching members 38 to 43. The switching members 38 and 39 are connected respectively in the leads from the outer ends of two corresponding 180° phase differentiated phase windings of the secondary windings 21 and 22 to the anode of the valve rectifier 34. The members 40 and 41 are similarly connected in the leads to the anode of the rectifier 35, and the members 42 and 43 are similarly connected in the leads to the rectifier 36. Referring to Fig. 5 one construction of said commutator is illustrated. Each switching member comprises a disc having semi-cylindrical conducting and non-conducting portions. The six conducting portions are electrically connected to slip rings and are insulatingly mounted on a rotatable shaft. The semi-circular conducting portions of the members 38 and 39 are phase differentiated by 180°. The semi-circular conducting portion of the members 40 and 41 are similarly arranged but both rotated through 120°; the semi-circular conducting segments of the members 42 and 43 are also similarly arranged but rotated through a further 120°. Each rectifier anode is thus connected to two commutator discs the semi-circular conducting portions of which are angularly displaced by 180°. Electrical connection to the discs and slip rings is made by suitably arranged brushes. The rotatable shaft is preferably driven by a synchronous motor energized by the alternating current. With the arrangement shown, the commutator is adapted to be rotated in a clockwise direction when the phase rotation of the alternating current is anti-clockwise. The commutator is arranged so that during the time a rectifier is non-conducting as regards the corresponding phase winding of the secondary 21, the anode is disconnected from this phase winding and connected to the corresponding 180° phase differentiated phase winding of the secondary 22. Since each rectifier is conducting only for 120 electrical degrees as regards any one phase winding the discs are arranged to disconnect the anode of any rectifier from one phase winding of the secondary 21 and simultaneously to connect the anode to the corresponding 180° phase differentiated phase winding of the secondary 22

30 electrical degrees after the rectifier has become non-conducting as regards the first phase winding and 30 electrical degrees before it becomes conducting as regards the second phase windings. 180 electrical degrees later the operation is reversed and the anode reconnected to the original phase winding and disconnected from the 180° phase differentiated phase winding. The inactive period of 60 electrical degrees corresponding to each switching operation allows for any phase swinging of the synchronous motor driving the commutator without the commutator discs having to make or break current. It is possible to employ commutator discs of other shapes and to arrange for the switching operations to occur at other times in the alternating current cycle and for further connections and disconnections to take place during said cycle.

In a three-phase valve rectifier system employing a commutator according to the invention, the effective inverse voltage across any rectifier is reduced by approximately half when the cut-off takes place 30 electrical degrees after the finish of a conducting period. The inverse voltage which can safely be applied to a rectifier is limited by various considerations, the most important of which for a valve wherein the gap between the electrodes is small is distortion or pull-over of the filament or cathode. Consequently, the input voltage in this arrangement can be made double that normally applied to a rectifier before the limiting inverse voltage is reached. That is to say, the output voltage of the rectifier can be doubled by this means, and consequently the efficiency of rectification can be increased. This efficiency of rectification cannot be obtained by increasing the length of the gap since this will increase the space charge loss in the valve. When the commutator is employed to reconnect the valve to another phase winding during the inactive portion of the cycle, then the current output of the rectifier is doubled; and since in rectifiers wherein the gap between the electrodes is small the loss entailed in heating the cathode is much greater than the space charge loss, this feature of the invention by itself, practically halves the loss in such a rectifier so that, as a result of doubling the voltage output and the current output, the power output of the rectifier can be increased four times with little additional loss, since, as stated above, the space charge energy loss is negligible. In addition, there is, of course, a considerable saving in the cost of rectifying valve plant. If the commutator discs are arranged so that the disconnection and reconnection of the valve anodes occur nearer to the active portion of the cycle, then the voltage, power output and efficiency of the rectifier can be further increased. This increase is only limited by mechanical difficulties due, for example, to phase swinging of the synchronous motor driving the rectifier.

It will be understood that various modifications may be made in the arrangements described without departing from the scope of the invention.

I claim as my invention:—

1. A polyphase alternating current rectifying system employing asymmetrically conducting devices including a commutator for disconnecting each one of said devices from its corresponding phase during the period of the alternating current cycle when it is non-conducting as regards said phase and for reconnecting it to another phase during said non-conducting period.

2. A polyphase alternating current rectifying system employing asymmetrically conducting devices including a single commutator for disconnecting all the devices from their corresponding phases during the periods of the alternating current cycle when they are respectively non-conducting as regards said phases and for reconnecting each of them to another phase during the corresponding non-conducting period.

3. A polyphase alternatitng current rectifying system employing asymmetrically conducting devices including a single commutator for disconnecting all the devices from their corresponding phases during the periods of the alternating current cycle when they are respectively non-conducting as regards said phases and for reconnecting each of them to a predetermined number of other phases during the corresponding non-conducting period.

4. A polyphase alternating current rectifying system employing asymmetrically conducting devices including means for disconnecting each one of said devices from its corresponding phase during the period of the alternating current cycle when it is non-conducting with regard to said phase, and means for reconnecting it to another phase during said non-conducting period, said means being adapted to effect the disconnection of any device from one phase and reconnection to another phase substantially intermediate between the end of the conducting period as regards the first phase and the beginning of the conducting period as regards the second phase.

5. A polyphase alternating current rectifying system employing asymmetrically conducting devices including means for disconnecting each one of said devices from its corresponding phase during the period of the alternating current cycle when it is non-conducting with regard to said phase, and means for reconnecting it to another phase during said non-conducting period, said means being adapted to effect the disconnection of any device from one phase and reconnection to another phase a predetermined time after the end of the conducting period as regards the first phase and a predetermined time before the conducting period as regards the second phase.

6. A double-Y alternating current rectifying system employing three asymmetrically conducting devices including a transformer energized from the alternating current circuit to which said devices are connected and having two secondaries, corresponding phase windings of which are phase differentiated by 180 degrees but wound on the same transformer leg, and a commutator to effect disconnection of a device from one phase winding of one secondary and connection to the corresponding 180° phase differentiated phase winding of the other secondary during the non-conducting period of the device as regards said phase and subsequent reconnection to the original phase winding during the non-conducting period of the device as regards the second phase winding.

In testimony whereof I have hereunto subscribed my name this 25th day of May, 1925.

ERNEST YEOMAN ROBINSON.